(12) United States Patent
Wyville (10) Patent No.: US 8,890,619 B2
(45) Date of Patent: Nov. 18, 2014

(54) PIM COMPENSATION IN A RECEIVER

(75) Inventor: Mark Wyville, Ottawa (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/565,167

(22) Filed: Aug. 2, 2012

(65) Prior Publication Data

US 2014/0036736 A1 Feb. 6, 2014

(51) Int. Cl.
*H03F 3/04* (2006.01)
*H03L 7/06* (2006.01)
*H04B 1/10* (2006.01)

(52) U.S. Cl.
USPC .......................... 330/296; 327/156; 455/295

(58) Field of Classification Search
USPC ........................................ 330/296; 327/156
See application file for complete search history.

(56) References Cited

U.S. PATENT DOCUMENTS

| | | | |
|---|---|---|---|
| 5,473,460 A | | 12/1995 | Haner et al. |
| 5,875,391 A | * | 2/1999 | Riley et al. .................. 455/295 |
| 6,041,223 A | * | 3/2000 | Thomas ........................ 455/326 |
| 7,505,530 B2 | | 3/2009 | Rexberg et al. |
| 7,634,198 B2 | | 12/2009 | Peral |
| 8,170,487 B2 | | 5/2012 | Sahota et al. |
| 2002/0121936 A1 | * | 9/2002 | Gharpurey et al. ........... 330/296 |
| 2003/0185164 A1 | * | 10/2003 | Marko et al. .................. 370/316 |
| 2004/0048576 A1 | | 3/2004 | Hildebrand et al. |
| 2004/0203458 A1 | | 10/2004 | Nigra |
| 2005/0134336 A1 | * | 6/2005 | Goldblatt et al. ............. 327/156 |
| 2006/0181344 A1 | * | 8/2006 | Ksienski et al. .......... 330/124 R |
| 2008/0129421 A1 | * | 6/2008 | Ninan et al. .................. 333/205 |
| 2009/0075612 A1 | * | 3/2009 | Keehr et al. ................ 455/226.1 |
| 2009/0203347 A1 | * | 8/2009 | Kaczman et al. ............ 455/326 |
| 2010/0093298 A1 | * | 4/2010 | Pratt et al. ................ 455/226.1 |
| 2011/0075754 A1 | | 3/2011 | Smith |
| 2011/0149714 A1 | | 6/2011 | Rimini et al. |
| 2012/0140860 A1 | | 6/2012 | Rimini et al. |
| 2012/0288026 A1 | | 11/2012 | Wang |
| 2012/0295558 A1 | | 11/2012 | Wang et al. |

FOREIGN PATENT DOCUMENTS

| | | |
|---|---|---|
| DE | 102010033841 A1 | 2/2012 |
| WO | 2008048534 A1 | 4/2008 |
| WO | 2009082084 A1 | 7/2009 |

OTHER PUBLICATIONS

International Search Report and Written Opinion for PCT/IB2013/056036, mailed Feb. 7, 2014, 8 pages.

(Continued)

*Primary Examiner* — Leon-Viet Nguyen
*Assistant Examiner* — Sarah Hassan
(74) *Attorney, Agent, or Firm* — Withrow & Terranova, PLLC (57) ABSTRACT

The present disclosure relates to compensation for Passive Intermodulation (PIM) distortion in a receiver. In one embodiment, a main receiver receives a radio frequency receive signal and outputs a main receiver output signal. In order to compensate for PIM distortion, a tunable non-linear circuit generates an Intermodulation Products (IMP) signal that includes a number of IMPs as a function of a signal that is indicative of the radio frequency transmit signal. An auxiliary receiver receives the IMP signal and outputs an auxiliary receiver output signal that includes only a subset of the IMPs that fall within a passband of the main receiver. The auxiliary receiver output signal is adaptively filtered to provide a PIM estimate signal, which is then subtracted from the main receiver output signal to provide a compensated output signal.

21 Claims, 6 Drawing Sheets

(56) References Cited

OTHER PUBLICATIONS

Li, Jian et al., "Adaptive Volterra Predistorters for Compensation of Non-linear Effects with Memory in OFDM Transmitters," Proceedings of the 4th Annual Communication Networks and Services Research Conference, May 24-25, 2006, Moncton, New Brunswick, Canada, 4 pages.

International Search Report and Written Opinion for PCT/IB2013/056155 mailed Feb. 19, 2014, 11 pages.

Notice of Allowance for U.S. Appl. No. 13/732,610 mailed Apr. 14, 2014, 9 pages.

Amin, N. et al., "Transmit and receive crosstalk cancellation," 6th International Conference on Emerging Technologies, Oct. 18-19, 2010, pp. 210-215.

Henrie, J. et al., "Prediction of passive intermodulation from coaxial connectors in microwave networks" IEEE Transactions on Microwave Theory and Techniques, vol. 56, No. 1. Jan. 2008, pp. 209-216.

Bassam et al., "2-D Digital Predistortion (2-D-DPD) Architecture for Concurrent Dual-Band Transmitters", IEEE Trans MTT, vol. 59, No. 10, Oct. 2011, p. 2547-2553.

Ghannouchi et al., "Behavioral Modeling and Predistortion", IEEE Microwave Magazine, Dec. 2009, pp. 52-64.

Author Unknown, "Agilent EESof EDA Premier Communications Design Software Product Overview", Aug. 3, 2011, 5989-7568EN, www.agilent.com/find/eesof.

Author Unknown, "Digital Pre-Distortion to Linearize PA Hands-On Workshop", ESL Design: Training and Events Details, Retrieved Nov. 22, 2012, 2 pages, www.home.agilent.com/agilent/eventDetail.

Author Unknown, "W1716ET SystemVue Digital Pre-Distortion Builder", SystemVue Design Kits and Application Personalities: Product Details, Retrieved Nov. 22, 2012, 2 pages, www.home.agilent.com/en.

Notice of Allowance for U.S. Appl. No. 13/732,610, mailed May 27, 2014, 10 pages.

\* cited by examiner

PIM COMPENSATION IN A RECEIVER

FIELD OF THE DISCLOSURE

The present disclosure relates to compensating for Passive Intermodulation (PIM) in a receiver.

BACKGROUND

Passive Intermodulation (PIM) occurs when signals are present in a passive device that exhibits some non-linear behavior. In a wireless communication device such as a base station of a wireless communication network, PIM occurs when a high power transmit signal is passed through a passive device that exhibits some non-linearity. This non-linear passive device is referred to as a PIM source. The PIM source may be a non-linear component in a transmit path of the wireless communication device such as, for example, a cable, a connector, a duplex filter, an antenna of the wireless communication device, or the like. The PIM source may alternatively be due to an object that is external to the wireless communication device (e.g., a fence). The wireless communication device may have multiple PIM sources.

The PIM created by a PIM source includes multiple Intermodulation Products (IMPs) (e.g., $2^{nd}$ order, $3^{rd}$ order, etc.) of the transmit signal. When any of the IMPs fall within a passband of a receiver of the wireless communication device, a resulting PIM distortion is introduced into the received signal and, as a result, the receiver is desensitized. PIM distortion is particularly problematic for multi-carrier or multi-band wireless communication devices. Multi-carrier or multi-band signals are an important characteristic of modern wireless communication standards (e.g., the Long Term Evolution (LTE) cellular communication standard) as well as multi-standard, or multi-band, wireless communication devices. As such, PIM distortion is becoming an increasingly important problem that needs to be addressed.

One previous approach to addressing PIM distortion is described in U.S. Patent Application Publication No. 2011/0075754, entitled "Mitigation of Transmitter Passive and Active Intermodulation Products in Real and Continuous Time in the Transmitter and Co-Located Receiver," which was filed on Aug. 5, 2010 and published on Mar. 31, 2011. In this published patent application, PIM distortion is estimated by modeling the PIM distortion with a polynomial model in the digital domain at baseband. However, this polynomial model requires a very large number of polynomial orders to accurately model the PIM distortion. For example, in J. Henrie, A. Christianson, W. J. Chappell, "Prediction of passive intermodulation from coaxial connectors in microwave networks," IEEE Trans. On Microwave Theory and Techniques, Vol. 56, No. 1, January 2008, pp. 209-216, it was determined that a $49^{th}$ order polynomial was required to accurately model the $AM_{Fund}$-$AM_{IM3}$ curve for the PIM of a Subminiature version A (SMA) connector, where $AM_{Fund}$-$AM_{IM3}$ represents a relationship between the amplitude of the input signal (fundamental) to the amplitude of the output IM3 signal. The required amount of digital resources required for the polynomial model increases as the number of orders of the polynomial model increases. As such, an accurate polynomial model of the PIM distortion requires, in many cases, a prohibitively large amount of digital resources.

Another approach to compensating for PIM distortion is described in N. M. Amin and M. Weber, "Transmit and receive crosstalk cancellation," 2010 $6^{th}$ International Conference on Emerging Technologies (ICET), Oct. 18-19, 2010, pp. 210-215. However, this approach assumes that the non-linear behavior of the PIM source (i.e., the shape of the $AM_{Fund}$-$AM_{IM3}$ and $AM_{Fund}$-$PM_{IM3}$ curves) is similar to that of the non-linearity of the power amplifier of the transmitter after power amplifier linearization has been applied. This assumption is very restrictive. As an example, a PIM source may have a certain ratio of $5^{th}$ to $3^{rd}$ order IMPs, but the linearized power amplifier may have a different ratio.

As such, there is a need for a system and method for compensating for PIM distortion in a receiver that overcomes the aforementioned problems associated with prior approaches.

SUMMARY

The present disclosure relates to compensation for Passive Intermodulation (PIM) distortion in a receiver. In one embodiment, a main receiver receives a radio frequency receive signal and outputs a main receiver output signal. The radio frequency receive signal includes PIM distortion that is a non-linear function of a radio frequency transmit signal output by a companion transmitter. In order to compensate for the PIM distortion, a tunable non-linear circuit generates an Intermodulation Products (IMP) signal that includes a number of IMPs as a function of a signal that is indicative of the radio frequency transmit signal. An auxiliary receiver receives the IMP signal output by the tunable non-linear circuit and outputs an auxiliary receiver output signal that includes only a subset of the IMPs that fall within a passband of the main receiver. An adaptive filter then adaptively filters the auxiliary receiver output signal to provide a PIM estimate signal that is an estimate of the PIM distortion in the main receiver output signal. Subtraction circuitry subtracts the PIM estimate signal from the main receiver output signal to provide a compensated output signal. Preferably, the tunable non-linear circuit and the adaptive filter are tuned to minimize, or at least substantially reduce, the PIM distortion in the compensated output signal.

In one embodiment, the signal that is indicative of the radio frequency transmit signal is the radio frequency transmit signal obtained from an output of the companion transmitter. In another embodiment, the main receiver and the companion transmitter are coupled to an antenna via a duplexer, and the signal that is indicative of the radio frequency transmit signal is the radio frequency transmit signal obtained from an antenna port of the duplexer (i.e., an output of the duplexer coupled to the antenna). In yet another embodiment, the signal that is indicative of the radio frequency transmit signal is a delayed version of the radio frequency transmit signal obtained from an output of the companion transmitter.

In another embodiment, the signal that is indicative of the radio frequency transmit signal is a low-power auxiliary transmit signal. More specifically, in one particular embodiment, the companion transmitter receives an input signal and generates the radio frequency transmit signal. A low-power auxiliary transmitter generates a low-power auxiliary transmit signal based on the input signal provided to the transmitter, where the low-power auxiliary transmit signal is provided to the tunable non-linear circuit as the signal that is indicative of the radio frequency transmit signal. Further, in one embodiment, a digital filter that models a difference between the companion transmitter and the low-power auxiliary receiver including a path between the output of the transmitter and the PIM source processes the input signal to provide a filtered input signal to the auxiliary transmitter. The low-power auxiliary transmitter then processes the filtered input signal to provide the low-power auxiliary transmit signal. In one embodiment, a carrier frequency of the low-power auxiliary transmit signal is the same as that of the radio frequency transmit signal. In another embodiment, the carrier frequency of the low-power transmit signal is less than that of the radio frequency transmit signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
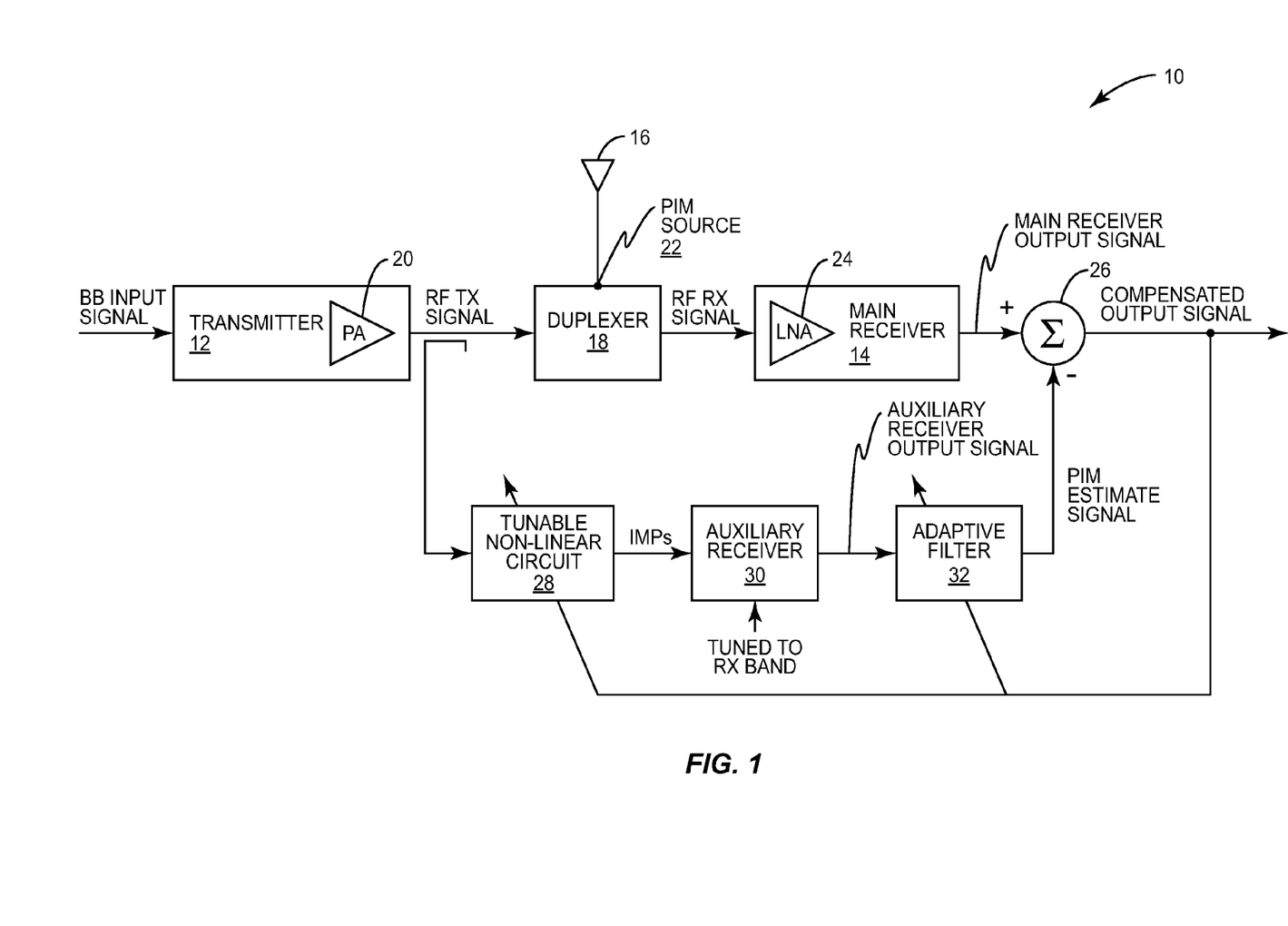
FIG. 1 illustrates a communication device including a receiver that compensates for Passive Intermodulation (PIM) distortion that is a non-linear function of a transmit signal transmitted by a transmitter of the communication device according to a first embodiment of the present disclosure.

The present disclosure relates to compensation for Passive Intermodulation (PIM) distortion in a receiver. In this regard, FIG. 1 illustrates a communication device 10 that compensates for PIM distortion in a receiver of the communication device 10 according to one embodiment of the present disclosure. The communication device 10 may be a base station for a cellular communication network, but is not limited thereto. The communication device 10 is preferably a multi-carrier or multi-band communication device (e.g., a commu-nication device that simultaneously operates in two different Long Term Evolution (LTE) frequency bands). As illustrated, the communication device 10 includes a transmitter 12 and a receiver 14 (also referred to herein as the main receiver 14) coupled to an antenna 16 via a duplexer 18. The transmitter 12 is referred to herein as a "companion transmitter" of the receiver 14. As used herein, the transmitter 12 is a "companion transmitter" of the receiver 14 if the transmitter 12 and the receiver 14 are coupled to the same antenna, which in FIG. 1 is the antenna 16. Typically, this occurs when the transmitter 12 and the receiver 14 are incorporated into a single transceiver.

The transmitter 12 includes conventional transmitter components such as, for example, up-conversion circuitry (not shown) and a power amplifier (PA) 20. The transmitter 12 operates to process (e.g., up-convert and amplify) a baseband input signal to output a radio frequency transmit signal. The radio frequency transmit signal then passes through the duplexer 18 to the antenna 16 such that the radio frequency transmit signal is transmitted by the communication device 10. After being output by the transmitter 12, the radio frequency transmit signal passes through a PIM source 22. In this example, the PIM source 22 is an antenna port of the duplexer 18 (i.e., an output of the PIM source 22 is coupled to the antenna 16). However, the PIM source 22 is not limited thereto. Rather, the PIM source 22 may be any passive component between an output of the transmitter 12 and the antenna 16 that includes some amount of non-linearity or even an object that is external to the communication device 10 (e.g., a fence). Due to the non-linearity of the PIM source 22, PIM is introduced into a radio frequency receive signal received at the antenna 16. The PIM includes a number of Intermodulation Products (IMPs) of the radio frequency transmit signal. The IMPs include $2^{nd}$ order IMPs, $3^{rd}$ order IMPs, etc.

The receiver 14 includes conventional receiver components such as, for example, a Low Noise Amplifier (LNA) 24, filters (not shown), down-conversion circuitry (not shown), and the like. The receiver 14 operates to process (e.g., amplify, filter, and down-convert) a radio frequency receive signal received from the antenna 16 via the duplexer 18 to output a main receiver output signal. The IMPs of the radio frequency transmit signal produced by the PIM source 22 that fall within a passband of the receiver 14 result in PIM distortion in the main receiver output signal that is output by the receiver 14. As discussed below, an estimate of the PIM distortion, which is referred to herein as a PIM estimate signal, is generated and provided to subtraction circuitry 26. The subtraction circuitry 26 operates to subtract the PIM estimate signal from the main receiver output signal in the digital domain to thereby provide a compensated output signal. The PIM estimate signal is generated such that the PIM distortion in the compensated output signal is minimized, or at least substantially reduced, as compared to the PIM distortion in the main receiver output signal.

In this embodiment, the PIM estimate signal is generated by a tunable non-linear circuit 28, an auxiliary receiver 30, and an adaptive filter 32 connected as shown. The tunable non-linear circuit 28 is not limited to any particular circuit and may be implemented using, for example, circuits conventionally used for pre- and post-distortion of power amplifiers. The tunable non-linear circuit 28 models the PIM source 22 to generate a number of IMPs using the radio frequency transmit signal obtained from the output of the transmitter 12. More specifically, the tunable non-linear circuit 28 processes the radio frequency transmit signal obtained from the output of the transmitter 12 to generate an output signal, which is referred to herein as an IMP signal, that includes a number of IMPs of the radio frequency transmit signal (e.g., $2^{nd}$ order, $3^{rd}$ order, etc.). Importantly, the tunable non-linear circuit 28 models the PIM source 22 in the analog domain at either radio frequency or some desired intermediate frequency. As such, the complexity of the circuitry used to model the PIM source 22 is substantially less complex than that required for a polynomial model approach that models the PIM or PIM distortion at baseband in the digital domain. Further, the tunable non-linear circuit 28 enables tuning to account for differences in the non-linear behavior of the PIM source 22 and the power amplifier 20 after any power amplifier linearization has been applied (i.e., the shape of the $AM_{Fund}$-$AM_{IM3}$ and $AM_{Fund}$-$PM_{IM3}$ curves).

The IMP signal output by the tunable non-linear circuit 28 is processed by the auxiliary receiver 30 to provide an auxiliary receiver output signal. The auxiliary receiver 30 models the receiver 14. More specifically, the auxiliary receiver 30 is tuned to the passband of the receiver 14 such that the auxiliary receiver output signal includes downconverted and digitized versions of only those IMPs that fall within the passband of the receiver 14.

The adaptive filter 32 then adaptively filters the auxiliary receiver output signal to provide the PIM estimate signal. The adaptive filter 32 models a difference between a main PIM path between the PIM source 22 and the output of the receiver 14 and an auxiliary PIM path between the output of the tunable non-linear circuit 28 and the output of the auxiliary receiver 30. Preferably, the tunable non-linear circuit 28 and the adaptive filter 32 are adaptively configured based on the compensated output signal such that the PIM distortion in the compensated output signal is minimized, or at least substantially reduced, as compared to that in the main receiver output signal. As an example, the tunable non-linear circuit 28 may be adaptively configured using a power minimization algorithm, and the adaptive filter 32 may be adaptively configured using a Least Mean Squares (LMS) algorithm or a variant thereof. Note, however, that these algorithms are examples only and are not intended to limit the scope of the present disclosure. Any suitable algorithms for adaptively configuring the tunable non-linear circuit 28 and the adaptive filter 32 in order to minimize, or at least substantially reduce, the PIM distortion in the compensated output signal may be used.

Figure 2:
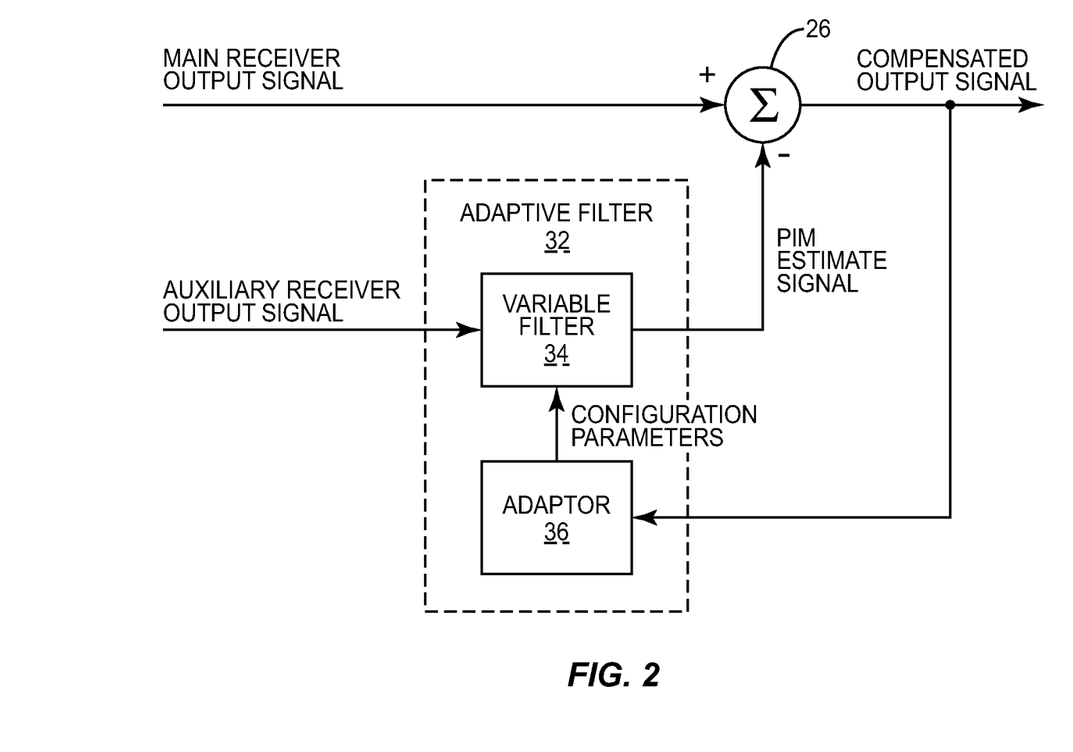
FIG. 2 is a more detailed illustration of one embodiment of the adaptive filter of FIG. 1.

FIG. 2 is a more detailed illustration of the adaptive filter 32 of FIG. 1 according to one embodiment of the present disclosure. In this embodiment, the adaptive filter 32 includes a variable filter 34 and an adaptor 36 connected as shown. In operation, the variable filter 34 filters the auxiliary receiver output signal to provide the PIM estimate signal. As discussed above, the subtraction circuitry 26 subtracts the PIM estimate signal from the main receiver output signal to provide the compensated output signal. Based on the compensated output signal, the adaptor 36 updates one or more configuration parameters (e.g., filter coefficients) for the variable filter 34 using a desired update, or adaptation algorithm (e.g., an LMS algorithm or a variant thereof) in order to minimize a difference between the main receiver output signal and the PIM estimate signal. Note that adaptation may be performed more quickly if performed during a period of time when the main receiver output signal includes only the PIM distortion (i.e., when there is no received signal). However, adaptation may be performed even when the main receiver output signal includes a received signal in addition to the PIM distortion.

Figure 3:
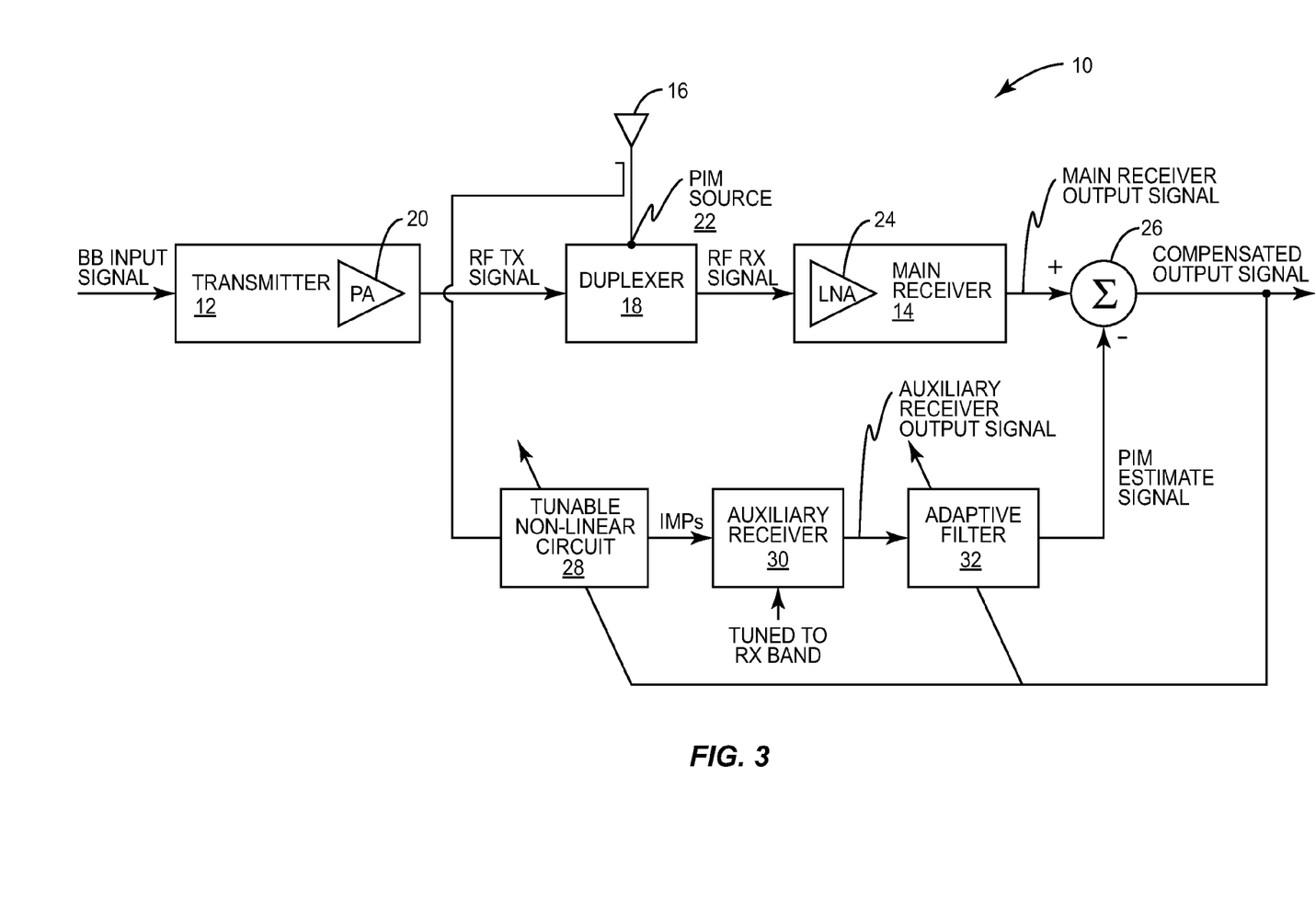
FIG. 3 illustrates a communication device including a receiver that compensates for PIM distortion that is a non-linear function of a transmit signal transmitted by a transmitter of the communication device according to a second embodiment of the present disclosure.

FIG. 3 illustrates the communication device 10 according to another embodiment of the present disclosure. This embodiment is substantially the same as that in FIG. 1 but where the input of the tunable non-linear circuit 28 is connected to the antenna port of the duplexer 18. In other words, the radio frequency transmit signal input to the tunable non-linear circuit 28 is obtained from the antenna port of the duplexer 18, which is also the PIM source 22. By tapping the radio frequency transmit signal at the PIM source 22, the most accurate version of the radio frequency transmit signal from which the PIM is produced is also input into the tunable non-linear circuit 28. It should also be noted that while FIGS. 1 and 3 illustrate embodiments where the radio frequency transmit signal is tapped at the output of the transmitter 12 and the antenna port of the duplexer 18, the present disclosure is not limited thereto. The radio frequency transmit signal may be tapped at any desired location between the output of the transmitter 12 and the antenna 16.

Figure 4:
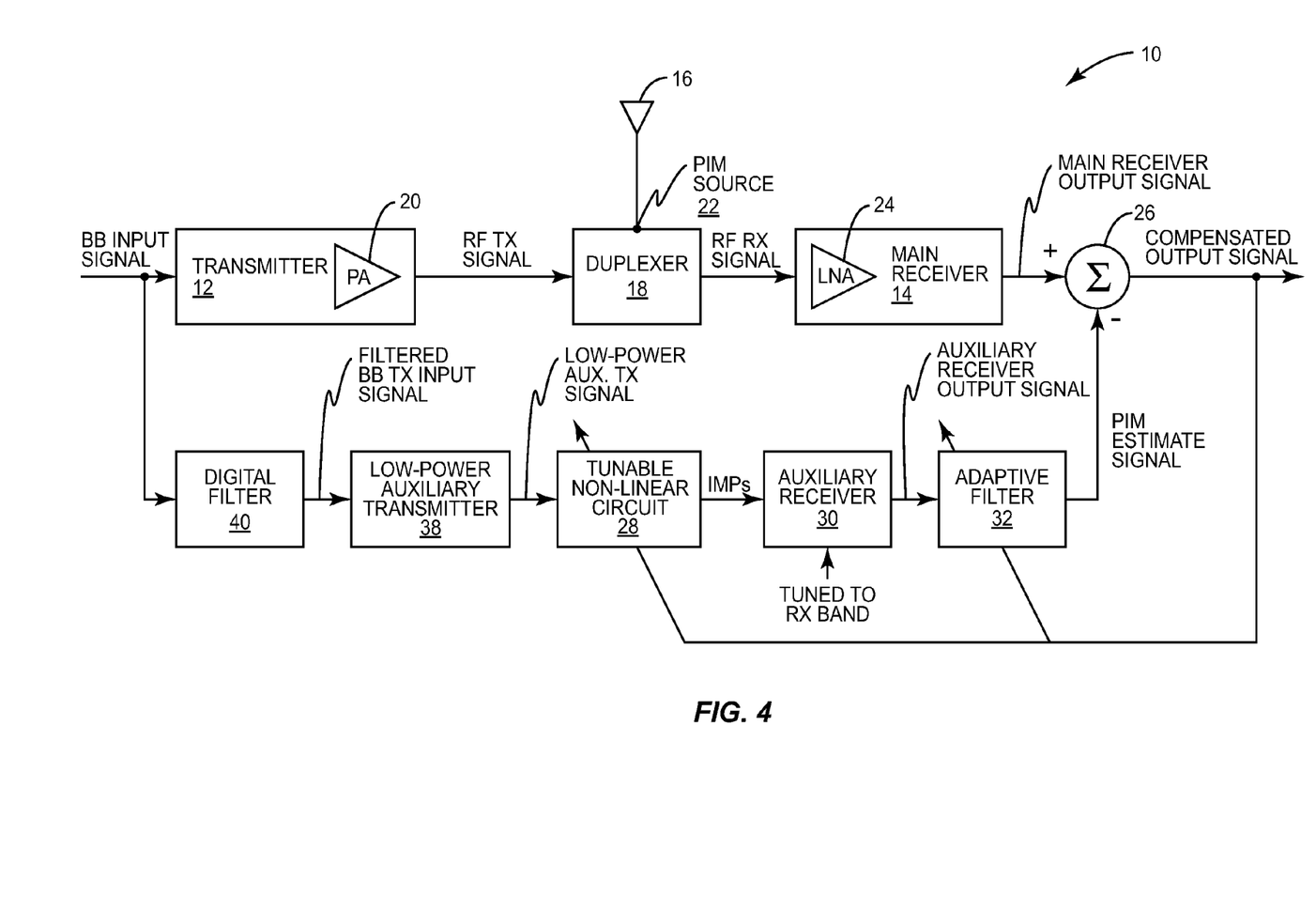
FIG. 4 illustrates a communication device including a receiver that compensates for PIM distortion that is a non-linear function of a transmit signal transmitted by a transmitter of the communication device according to a third embodiment of the present disclosure.

FIG. 4 illustrates the communication device 10 according to another embodiment of the present disclosure. This embodiment is substantially the same as that in FIG. 1 but where the input of the tunable non-linear circuit 28 is a low-power auxiliary transmit signal generated by a low-power auxiliary transmitter 38. As used herein, the "low-power" auxiliary transmitter 38 is a transmitter that models the transmitter 12 but that generates an output signal at a power level that is less than, and preferably substantially less than, a power level of the radio frequency transmit signal output by the transmitter 12.

In this embodiment, the baseband input signal of the transmitter 12 is also processed by an auxiliary transmit path to provide the low-power auxiliary transmit signal. More specifically, the baseband input signal is provided to a digital filter 40. The digital filter 40 is configured to model a difference between the auxiliary transmit path and the main transmit path through the transmitter 12 preferably including the path between the output of the transmitter 12 and the PIM source 22. The digital filter 40 may be an adaptive filter to permit modeling of the difference between the main and auxiliary transmit paths regardless of the location of the PIM source 22 in the main transmit path (e.g., at a connector at the output of the duplexer 18, external to the antenna 16, or the like).

The digital filter 40 outputs a filtered baseband input signal, which is processed by the low-power auxiliary transmitter 38 to provide the low-power auxiliary transmit signal. In one embodiment, the low-power auxiliary transmitter 38 generates the low-power auxiliary transmit signal such that a carrier frequency of the low-power auxiliary transmit signal is the same as that of the radio frequency transmit signal. However, in another embodiment, the low-power auxiliary transmitter 38 generates the low-power auxiliary transmit signal such that the carrier frequency of the low-power auxiliary transmit signal is less than, and preferably substantially less than, that of the radio frequency transmit signal. For example, the low-power auxiliary transmit signal may be generated at 500 megahertz (MHz), whereas the radio frequency auxiliary transmit signal may be generated at a significantly higher frequency (e.g., 2,000 MHz). As a result, the auxiliary transmit path may operate at a much lower frequency than the main transmit path, which in turn reduces cost and complexity.

The low-power auxiliary transmit signal is provided to the input of the tunable non-linear circuit 28. The tunable non-linear circuit 28, the auxiliary receiver 30, and the adaptive filter 32 then operate in the manner described above to generate the PIM estimate signal as a function of the low-power auxiliary transmit signal. The subtraction circuitry 26 then subtracts the PIM estimate signal from the main receiver output signal to provide the compensated output signal.

Figure 5:
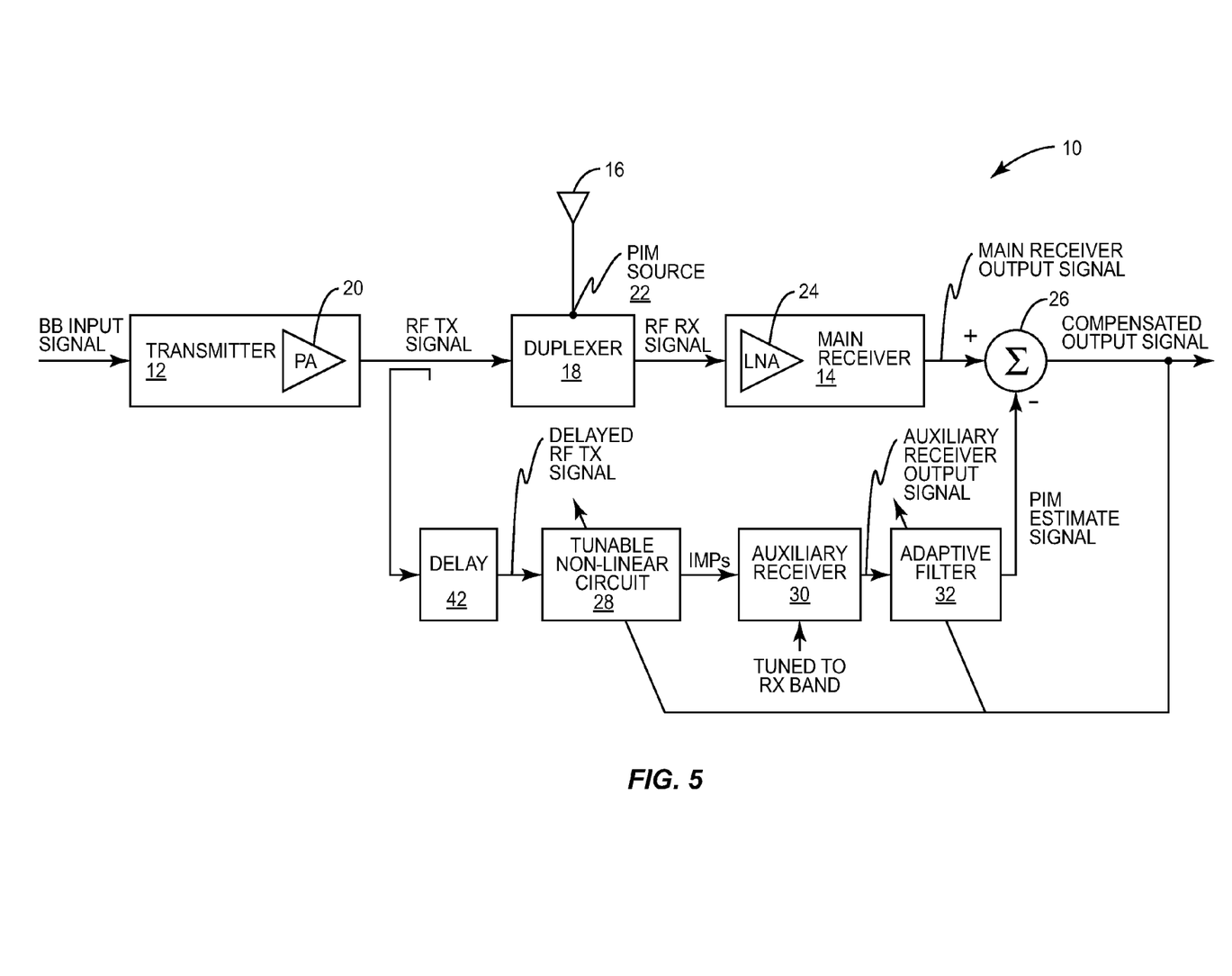
FIG. 5 illustrates a communication device including a receiver that compensates for PIM distortion that is a non-linear function of a transmit signal transmitted by a transmitter of the communication device according to a fourth embodiment of the present disclosure.

FIG. 5 illustrates the communication device 10 according to yet another embodiment of the present disclosure. This embodiment is substantially the same as that in FIG. 1 but where the input of the tunable non-linear circuit 28 is connected to the output of the transmitter 12 via a delay 42. In other words, in this embodiment, a delayed version of the radio frequency transmit signal is provided as the input of the tunable non-linear circuit 28. The delay 42 may be implemented as a filter. The delay 42 operates to add an additional group delay before the tunable non-linear circuit 28. This additional group delay may be configured to better match a group delay of the path between the output of the transmitter 12 and the PIM source 22. The group delay of the path between the output of the transmitter 12 and the PIM source 22 results in frequency dependent $AM_{Fund}$-$PM_{IM3}$ curves. The additional group delay added by the delay 42 reduces this dependency by matching out the delays.

Figure 6:
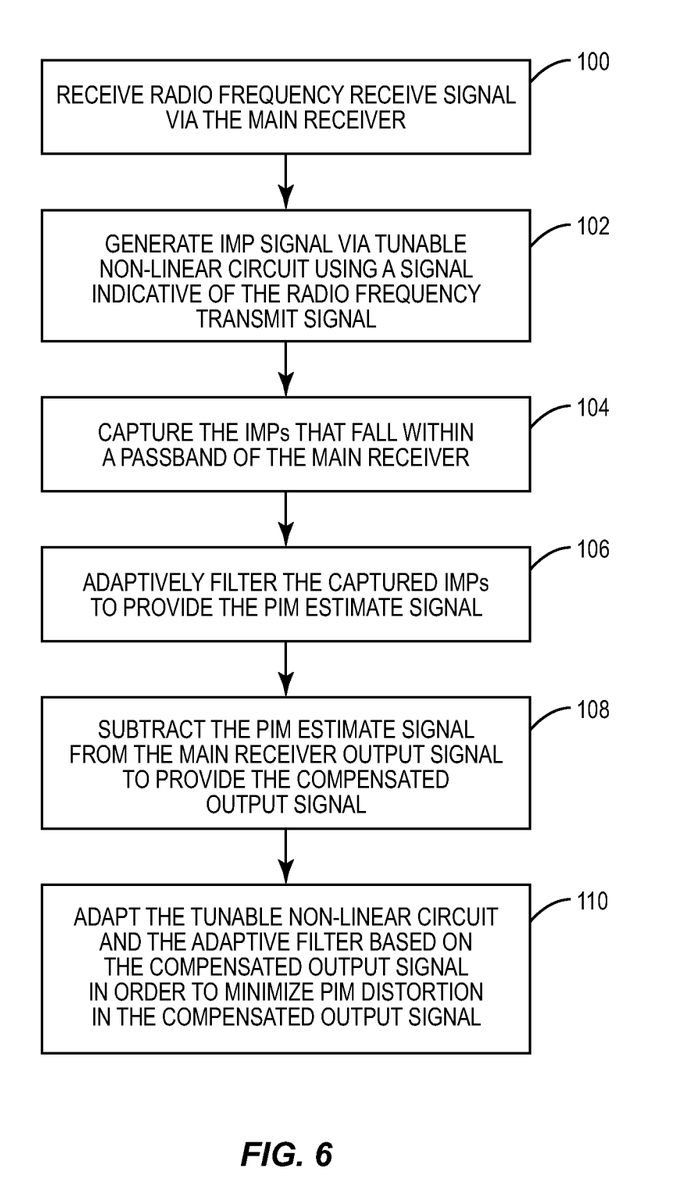
FIG. 6 is a flow chart that illustrates a process for compensating for PIM distortion in a receiver of a communication device, where the PIM distortion is a non-linear function of a transmit signal transmitted by a transmitter of the communication device, according to one embodiment of the present disclosure.

FIG. 6 is a flow chart illustrating a process for compensating for PIM distortion at the receiver 14 according to one embodiment of the present disclosure. As illustrated, the radio frequency receive signal from the antenna 16 is received by the receiver 14 to provide the main receiver output signal (block 100). The radio frequency receive signal includes the IMPs of the radio frequency transmit signal generated at the PIM source 22. In addition, the IMP signal is generated by the tunable non-linear circuit 28 using the signal that is indicative of the radio frequency transmit signal output by the transmitter 12 (block 102). The IMPs that are in the passband of the receiver 14 are then captured by the auxiliary receiver 30 (block 104), and the resulting auxiliary receiver output signal is adaptively filtered by the adaptive filter 32 to provide the PIM estimate signal (block 106). The PIM estimate signal is then subtracted from the main receiver output signal to thereby provide the compensated output signal (block 108). Lastly, prior to and/or during operation, the tunable non-linear circuit 28 and the adaptive filter 32 are adaptively configured to minimize, or at least substantially reduce, the PIM distortion in the compensated output signal (block 110).

The following acronyms are used throughout this disclosure.

IMP Intermodulation Products
LMS Least Mean Square
LNA Low Noise Amplifier
LTE Long Term Evolution
MHz Megahertz
PA Power Amplifier
PIM Passive Intermodulation
SMA Subminiature Version A Those skilled in the art will recognize improvements and modifications to the preferred embodiments of the present disclosure. All such improvements and modifications are considered within the scope of the concepts disclosed herein and the claims that follow.

What is claimed is:

1. A communication device comprising:
a transmitter configured to receive an input signal and output a radio frequency transmit signal that is transmitted by the communication device;
a main receiver configured to receive a radio frequency receive signal and output a main receiver output signal, the main receiver output signal comprising passive intermodulation distortion that is a non-linear function of the radio frequency transmit signal output by the transmitter;
a tunable non-linear circuit configured to generate an intermodulation product signal comprising a plurality of intermodulation products as a function of a signal that is indicative of the radio frequency transmit signal;
an auxiliary receiver configured to receive the intermodulation product signal to provide an auxiliary receiver output signal comprising only a subset of the plurality of intermodulation products that fall within a passband of the main receiver;
an adaptive filter configured to adaptively filter the auxiliary receiver output signal to provide a passive intermodulation estimate signal that is an estimate of the passive intermodulation distortion in the main receiver output signal; and
subtraction circuitry configured to subtract the passive intermodulation estimate signal from the main receiver output signal to thereby provide a compensated output signal.

2. The communication device of claim 1 wherein the tunable non-linear circuit and the adaptive filter are adaptively controlled to minimize the passive intermodulation distortion in the compensated output signal.

3. The communication device of claim 1 wherein the adaptive filter comprises:
a variable filter configured to filter the auxiliary receiver output signal to provide the passive intermodulation estimate signal; and
an adaptor configured to adaptively tune one or more parameters of the variable filter based on the compensated output signal using a desired adaptation algorithm.

4. The communication device of claim 3 wherein the desired adaptation algorithm is one of a group consisting of: a Least Mean Squares algorithm and a variant of the Least Mean Squares algorithm.

5. The communication device of claim 1 wherein the tunable non-linear circuit is tuned based on a power minimization technique.

6. The communication device of claim 1 wherein the signal that is indicative of the radio frequency transmit signal is the radio frequency transmit signal obtained from an output of the transmitter.

7. The communication device of claim 1 wherein the transmitter and the main receiver are coupled to an antenna of the communication device via a duplexer, and the signal that is indicative of the radio frequency transmit signal is the radio frequency transmit signal obtained from an antenna port of the duplexer.

8. The communication device of claim 1 wherein the signal that is indicative of the radio frequency transmit signal is a low-power auxiliary transmit signal generated from the input signal of the transmitter.

9. The communication device of claim 8 wherein the input signal of the transmitter is a baseband input signal.

10. The communication device of claim 9 further comprising:
a low-power auxiliary transmitter configured to provide the low-power auxiliary transmit signal based on the baseband input signal of the transmitter.

11. The communication device of claim 10 further comprising:
a digital filter configured to receive the baseband input signal of the transmitter and output a filtered baseband input signal;
wherein the low-power auxiliary transmitter receives the filtered baseband input signal and outputs the low-power auxiliary transmit signal.

12. The communication device of claim 11 wherein the digital filter models a difference between a transmit path comprising the transmitter and a path between an output of the transmitter and a source of the passive intermodulation distortion and an auxiliary transmit path comprising the low-power auxiliary transmitter.

13. The communication device of claim 8 wherein a carrier frequency of the low-power auxiliary transmit signal is equal to a carrier frequency of the radio frequency transmit signal.

14. The communication device of claim 8 wherein a carrier frequency of the low-power auxiliary transmit signal is less than a carrier frequency of the radio frequency transmit signal.

15. The communication device of claim 1 further comprising delay circuitry configured to delay the radio frequency transmit signal obtained from an output of the transmitter to provide the signal that is indicative of the radio frequency transmit signal.

16. A method of operation of a communication device comprising:
   receiving, via a main receiver, a radio frequency receive signal to provide a main receiver output signal, the main receiver output signal comprising passive intermodulation distortion that is a non-linear function of a radio frequency transmit signal of a companion transmitter;
   generating an intermodulation product signal comprising a plurality of intermodulation products as a function of a signal that is indicative of the radio frequency transmit signal;
   capturing only a subset of the plurality of intermodulation products that fall within a passband of the main receiver from the intermodulation product signal via an auxiliary receiver to thereby provide an auxiliary receiver output signal;
   adaptively filtering the auxiliary receiver output signal to provide a passive intermodulation estimate signal that is an estimate of the passive intermodulation distortion in the main receiver output signal; and
   subtracting the passive intermodulation estimate signal from the main receiver output signal to thereby provide a compensated output signal.

17. The method of claim 16 wherein generating the intermodulation product signal comprises generating the intermodulation product signal via a tunable non-linear circuit, and adaptively filtering the auxiliary receiver output signal comprises adaptively filtering the auxiliary receiver output signal via an adaptive filter, and the method further comprises:
   configuring the tunable non-linear circuit and the adaptive filter to minimize the passive intermodulation distortion in the compensated output signal.

18. The method of claim 16 wherein the signal that is indicative of the radio frequency transmit signal is the radio frequency transmit signal obtained from an output of the companion transmitter.

19. The method of claim 16 wherein the companion transmitter and the main receiver are coupled to an antenna of the communication device via a duplexer, and the signal that is indicative of the radio frequency transmit signal is the radio frequency transmit signal obtained from an antenna port of the duplexer.

20. The method of claim 16 wherein the signal that is indicative of the radio frequency transmit signal is a low-power auxiliary transmit signal generated from an input signal of the companion transmitter.

21. The method of claim 16 further comprising delaying the radio frequency transmit signal obtained from an output of the companion transmitter to provide the signal that is indicative of the radio frequency transmit signal.

* * * * *